United States Patent
Dove (10) Patent No.: US 6,222,854 B1
(45) Date of Patent: Apr. 24, 2001

(54) LINK MONITOR STATE MACHINE

(75) Inventor: Daniel Joseph Dove, Applegate, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/044,640

(22) Filed: Mar. 19, 1998

(51) Int. Cl.$^7$ ........................................................ H04J 3/16
(52) U.S. Cl. ........................................ 370/465; 370/241
(58) Field of Search ........................................ 370/431, 445, 370/456, 459, 463, 241, 242; 709/224, 232, 239; 714/4, 39, 43, 47, 55, 56; 710/18

(56) References Cited

U.S. PATENT DOCUMENTS

| | | | |
|---|---|---|---|
| 5,577,069 | * 11/1996 | Lau | 375/242 |
| 5,754,540 | * 5/1998 | Liu | 370/315 |
| 5,754,552 | * 5/1998 | Allmond | 370/410 |
| 6,141,352 | * 10/2000 | Gandy | 370/463 |

OTHER PUBLICATIONS

IEEE Std 802.3u (CSMA/CD) Chapter 24 and 25, (1995), pp. 157–197.

* cited by examiner

Primary Examiner—Douglas Olms
Assistant Examiner—Ricardo M. Pizarro (57) ABSTRACT

A network node is connectable to a network. The node includes a physical media access sublayer. The physical media access sublayer includes a link monitor state machine. The link monitor state machine includes an evaluate link state, an evaluate carrier state, an increment criteria state and a link down state. In the evaluate link state, an idle timer is started. The evaluate carrier state is entered from the evaluate link state when a carrier event is detected before expiration of the idle timer. In the evaluate carrier state, a valid carrier timer is started. The increment criteria state is entered from the evaluate carrier state if a status error is detected or if the carrier event completes before expiration of the valid carrier timer. In the increment criteria state, a false carrier count is incremented. The link down state is entered from the increment criteria state if the false carrier count, after being incremented, is equal to a false carrier count limit.

21 Claims, 4 Drawing Sheets

LINK MONITOR STATE MACHINE

BACKGROUND

The present invention concerns data transfer over a network and pertains particularly to a link monitor state machine used in a physical media access sublayer of 100BASE-TX technology.

The IEEE 802.3 committee has defined a standard technology for 100 megabits per second networking over category five (CAT-5) Unshielded Twisted Pair (UTP) cabling. This technology is known as 100BASE-TX and is defined in Clauses 24 and 25 of the specification IEEE 802.3u-1995.

Within the 100BASE-TX technology physical sublayer (PHY), as defined in Clauses 24 and 25 of the specification IEEE 802.3u-1995, there is a Physical Coding Sublayer (PCS), a Physical Media Access (PMA) sublayer, and a Physical Media Dependent (PMD) sublayer. The PCS defines how data is encoded and decoded, how the Carrier Sense (CS) and Collision Detection (CD) functions work, and the interface between higher and lower layers in the protocol specification. The PMA defines the mapping of code bits, generation of a control signal (link_status) which indicates the availability of the PMD, generation of control signals to the PCS that indicate Carrier Sense, Collision Detection and Physical Layer Errors, and clock recovery. The PMD defines the signaling method and the various physical parameters that are necessary to address the link's physical requirements. Within the PMA, as defined in the specification IEEE 802.3u-1995, there is a state machine which is described as the LINK MONITOR state machine. It is described in section 24.3.4.4 and by a diagram depicted in FIGS. 24-15. This state machine is intended to provide a mechanism which determines whether the underlying physical layer is providing reliable data.

The LINK MONITOR state machine described in section 24.3.4.4 and by a diagram depicted in FIGS. 24-15 of the specification IEEE 802.3u-1995 assumes that if a link has been connected and the signal energy is sufficient to cause an indication of "signal_status ON" for more than 330 micro-seconds, then the link must be reliable. However, a link which exceeds the signal amplitude requirements to generate a "signal_status ON" may in fact have a Bit Error Rate (BER) that is substantially above the acceptable level as defined by requirements set out in the specification IEEE 802.3u-1995. A link which has a Bit Error Rate (BER) that is substantially above the acceptable level is unreliable.

When using the LINK MONITOR state machine described in section 24.3.4.4 of the specification IEEE 802.3u-1995, once a link has been enabled to operate, it will go to a state known as "LINK UP,' and stay there until either the signal_status goes to OFF or a control signal is asserted to bring the link down. The BER of the link has no direct impact on link_status.

The 100BASE-TX technology uses a protocol known as Carrier-Sense, Multiple Access with Collision Detection (CSMA-CD). The CSMA-CD protocol depends on the reliable ability of each node to detect when another node in the network is transmitting (Carrier Sense) and when more than one node in the network is transmitting (Collision Detection). If bit errors occur during a packet, a re-transmission may occur which reduces network performance. However, if a protocol error occurs, the impact upon network performance degrades substantially.

The 100BASE-TX technology uses a continuous signaling mechanism to communicate across the link. This means that the lack of "Carrier" is actually a stream of bits known as "IDLE" symbols. If a bit error occurs in the reception of the IDLE symbols, then "Carrier Sense" or "Collision" may be detected. Therefore, this System absolutely depends on a reliable BER to operate properly. An unacceptable BER on any link in the network will result in substantial disruption and degradation of network performance.

SUMMARY OF THE INVENTION

In accordance with the preferred embodiment of the present invention, a network node is connectable to a network. The node includes a physical media access sublayer. The physical media access sublayer includes a link monitor state machine. The link monitor state machine includes an evaluate link state, an evaluate carrier state, an increment criteria state and a link down state. In the evaluate state, an idle timer is started. The evaluate carrier state is entered from the evaluate link state when a carrier event is detected before expiration of the idle timer. In the evaluate carrier state, a valid carrier timer is started. The increment criteria state is entered from the evaluate carrier state if a status error is detected or if the carrier event completes before expiration of the valid carrier timer. In the increment criteria state, a false carrier count is incremented. The link down state is entered from the increment criteria state if the false carrier count, after being incremented, is equal to a false carrier count limit.

Additionally in the preferred embodiment, in the increment criteria state, if the idle timer is not already at a maximum value, the current value of the idle timer is increased. Also, the link monitor state machine additionally includes a decrement criteria state which is entered from the evaluate link state upon expiration of the idle timer. In the decrement criteria state, if the idle timer is not already at a minimum value, a current value of the idle timer is reduced.

Additionally in the preferred embodiment, in the link down state, the idle timer is set to the minimum value and a link status is set to fail. Also, the link monitor state machine additionally includes a hysteresis state and a link ready state. The hysteresis state is entered from the link down state, upon reception of a signal status on. In the hysteresis state, a stabilizer timer is started. A link ready state is entered from the hysteresis state, upon reception of a signal status on. In the link ready state, the link status is set to ready. Upon a link control being enabled, the evaluate link state is entered.

Also, in the preferred embodiment, the link monitor state machine additionally includes a valid carrier state. The valid carrier state is entered from the evaluate carrier state when the valid carrier timer expires and the carrier status is off. In the valid carrier state, the false carrier count is set to zero, and if the idle timer expires, the decrement criteria state is entered.

Also, in the preferred embodiment, the link monitor state machine additionally includes a link up state. The link up state is entered from the decrement criteria state. In the link up state, the link status is set to OK. In the link up state, upon a link control being equal to enable, the evaluate link state is entered. Also, in the link up state, upon link_control equaling SCAN_FOR_CARRIER, the link down state is entered.

In the valid carrier state, if the carrier status is on, the evaluate carrier state is entered. In the valid carrier state, if the idle timer expires, the decrement criteria state is entered. In the valid carrier state, if the carrier status is on, the evaluate carrier state is entered.

The present invention allows the upper layers of the 100BASE-TX as defined in Clauses 24 and 25 of the specification IEEE 802.3u-1995, to rely upon the Physical Coding Sublayer (PCS), the Physical Media Access (PMA) sublayer, and the Physical Media Dependent (PMD) sublayer. Instead of getting false "Carrier Sense" or false "collision Detection", the protocol will perform reliably, or the link will indicate Link_status=Fail and disconnect itself from the network.

DESCRIPTION OF THE PREFERRED EMBODIMENT

Figure 1:
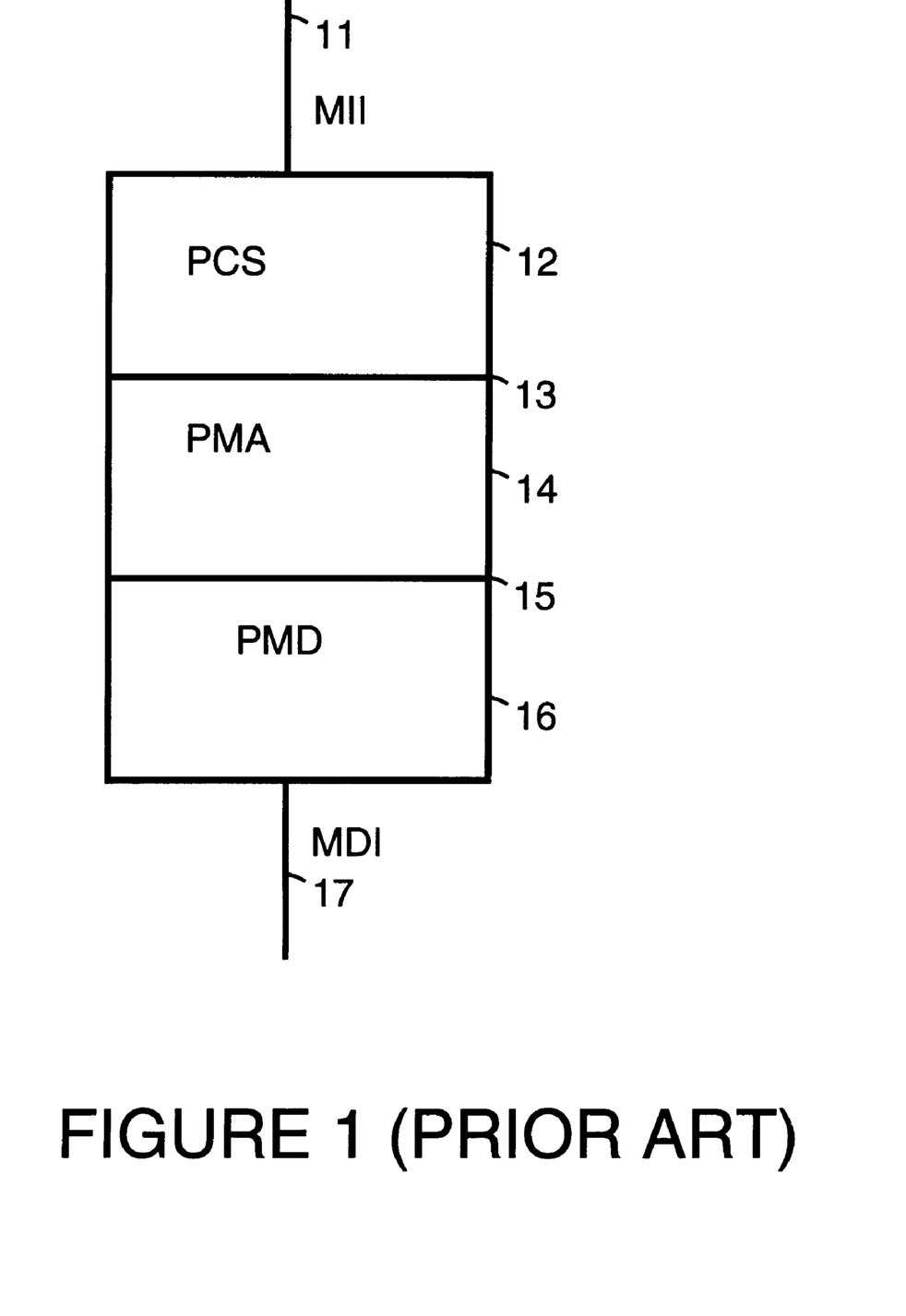
FIG. 1 is a simplified block diagram which shows organization of sublayers within the 100BASE-TX technology physical sublayer (PHY), as defined in Clauses 24 and 25 of the specification IEEE 802.3u-1995.

FIG. 1 is a simplified block diagram which shows organization of sublayers within the 100BASE-TX technology physical sublayer (PHY), as defined in Clauses 24 and 25 of the specification IEEE 802.3u-1995.

A Physical Coding Sublayer (PCS) 12 defines how data is encoded and decoded, how the Carrier Sense (CS) and Collision Detection (CD) functions work, and the interface between higher and lower layers in the protocol specification. A Physical Media Access (PMA) sublayer 14 defines the mapping of code bits, generation of a control signal (link_status) which indicates the availability of a Physical Media Dependent (PMD) sublayer 16, generation of control signals to the PCS that indicate Carrier Sense, Collision Detection and Physical Layer Errors, and clock recovery. Physical Media Dependent (PMD) sublayer 16 defines the signaling method and parameters for the various physical parameters that are necessary to address the link's physical requirements.

Physical Coding Sublayer (PCS) 12 uses a media independent interface (MII) 11 as a service interface to transfer information to and from a media access control (MAC) (via a Reconciliation sublayer) or another PCS client, such as a repeater. Further definition of MII 11 is given in Clause 22 of the specification IEEE 802.3u-1995.

A Media Dependent Interface (MDI) 17 provides the actual medium attachment, including connectors, for various supported media. The 100BASE-TX technology, as defined in the specification IEEE 802.3u-1995, does not specify MDI 17 other than including he appropriate standard by reference along with the minor adaptations necessary for 100BASE-TX.

PMA 14 communicates with PCS 12 through a PMA service interface 13. PMD 16 communicates with PMA 14 through a PMD service interface 15.

Figure 2:
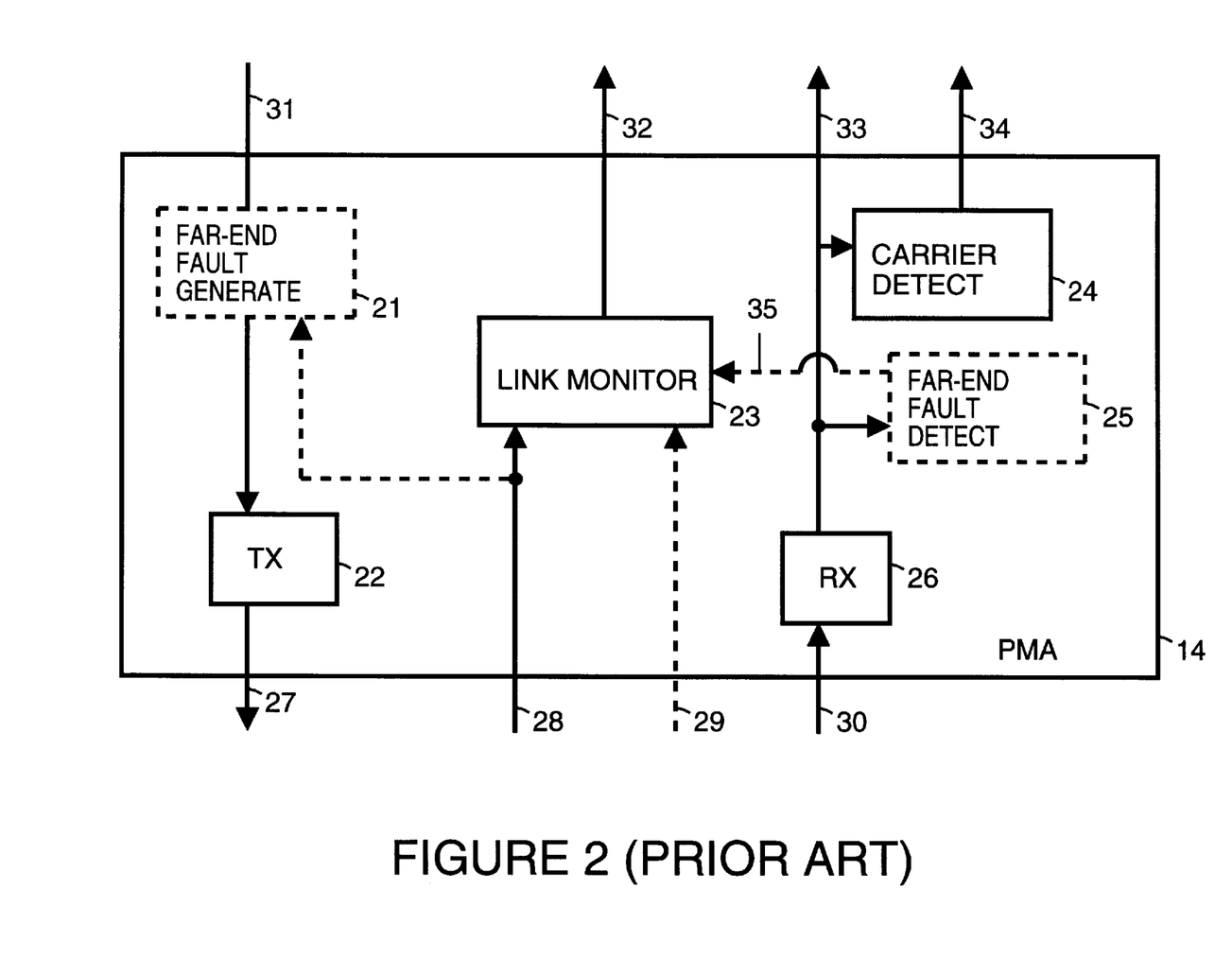
FIG. 2 is a functional block diagram of the Physical Media Access (PMA) sublayer within the PHY, as defined in Clauses 24 and 25 of the specification IEEE 802.3u-1995.

FIG. 2 is a functional block diagram of Physical Media Access (PMA) sublayer 14, as defined in Clause 24 of the specification IEEE 802.3u-1995 .

Transmit logic (TX) 22 is used to forward data received from PCS 12 on transmission channel (tx_code-bit) 31 to PMD 16 over transmit (tx_nrzi-bit) channel 27.

Receive logic (RX) 26 is used to forward data received from PMD 16 on reception channel (rx_nrzi-bit) 30 to PCS 12 over reception channel (rx_code-bit) 33.

Carrier detect logic 24, based on data placed on reception channel (rx_code-bit) 33, generates two status signals (carrier_status and rxerror_status) which are placed on lines 34.

A link monitor state machine 23 generates a link_status signal sent to PCS 12 over a channel 32. Link monitor state machine 23 generates the link_status signal based on a signal_status signal on a line 28. Additional signals used include a link_control signal placed on a channel 29 and/or a fault detection signal generated by Far-End fault detect logic 25, if present.

When no signal is being received, as indicated by the signal detect function of PMD 16, Far-End fault detect logic 25 permits the station to transmit a special Far-End Fault Indication to its far-end peer. The Far-End Fault Indication is sent only when a physical error condition is sensed on the receive channel. In all other situations, including reception of the Far-End Fault Indication itself, PMA 14 passes through tx_code-bit.

Far-End Fault Indication is implemented through Far-End fault detect logic 25, Far-End fault generate logic 21 and link monitor state machine 23. Far-End fault generate logic 21 is interposed between the incoming tx_code-bit stream and the TX 22 and, upon Far-End fault detect logic 25, sensing a receive channel failure (signal_status=OFF), transmits the Far-End Fault Indication in response. The transmission of the Far-End Fault Indication may start or stop at any time depending only on signal_status. Far-End fault detect logic 25 process continuously monitors rx_code-bits from RX 26 for the Far-End Fault Indication. Detection of the Far-End Fault Indication disables the station by asserting a faulting signal 35 and causing link monitor state machine 23 to deassert link_status, which in turn causes the station to source IDLE. Far-End fault detect logic 25 can also be used for other management functions.

The LINK MONITOR state machine described in section 24.3.4.4 and by a diagram depicted in FIGS. 24-15 of the specification IEEE 802.3u-1995 assumes that if a link has been connected and the signal energy is sufficient to cause an indication of "signal_status ON" for more than 330 micro-seconds, then the link must be reliable. However, a link which exceeds the signal amplitude requirements to generate a "signal_status ON" may in fact have a Bit Error Rate (BER) that is substantially above the acceptable level as defined by requirements set out in the specification IEEE 802.3u-1995. A link which has a Bit Error Rate (BER) that is substantially above the acceptable level is unreliable.

When using the LINK MONITOR state machine described in section 24.3.4.4 of the specification IEEE 802.3u-1995, once a link has been enabled to operate, it will go to a state known as "LINK UP,' and stay there until either the signal_status goes to OFF or a control signal is asserted to bring the link down. The BER of the link has no direct impact on link_status.

In the present invention, however, link monitor state machine 23 is modified to provide a mechanism for ensuring that the link is indeed reliable. Link monitor state machine 23, as modified, provides a method for evaluating the content of information on the link at a level that is readily available to this sublayer and then provides an algorithm for determining that the BER is acceptable.

If the BER is unacceptable, link monitor state machine 23 provides a method of bringing the link_status signal down, notifying upper protocol layers of the condition, and returning to a state where the link status may be returned to LINK UP when BER has reached an acceptable level.

Thus link monitor state machine 23 allows the upper layers of the 802.3u protocol to rely upon PCS 12, PMA 14 and PMD 16. Instead of getting false "Carrier Sense" or false "Collision Detection", the protocol will perform reliably.

Figure 3:
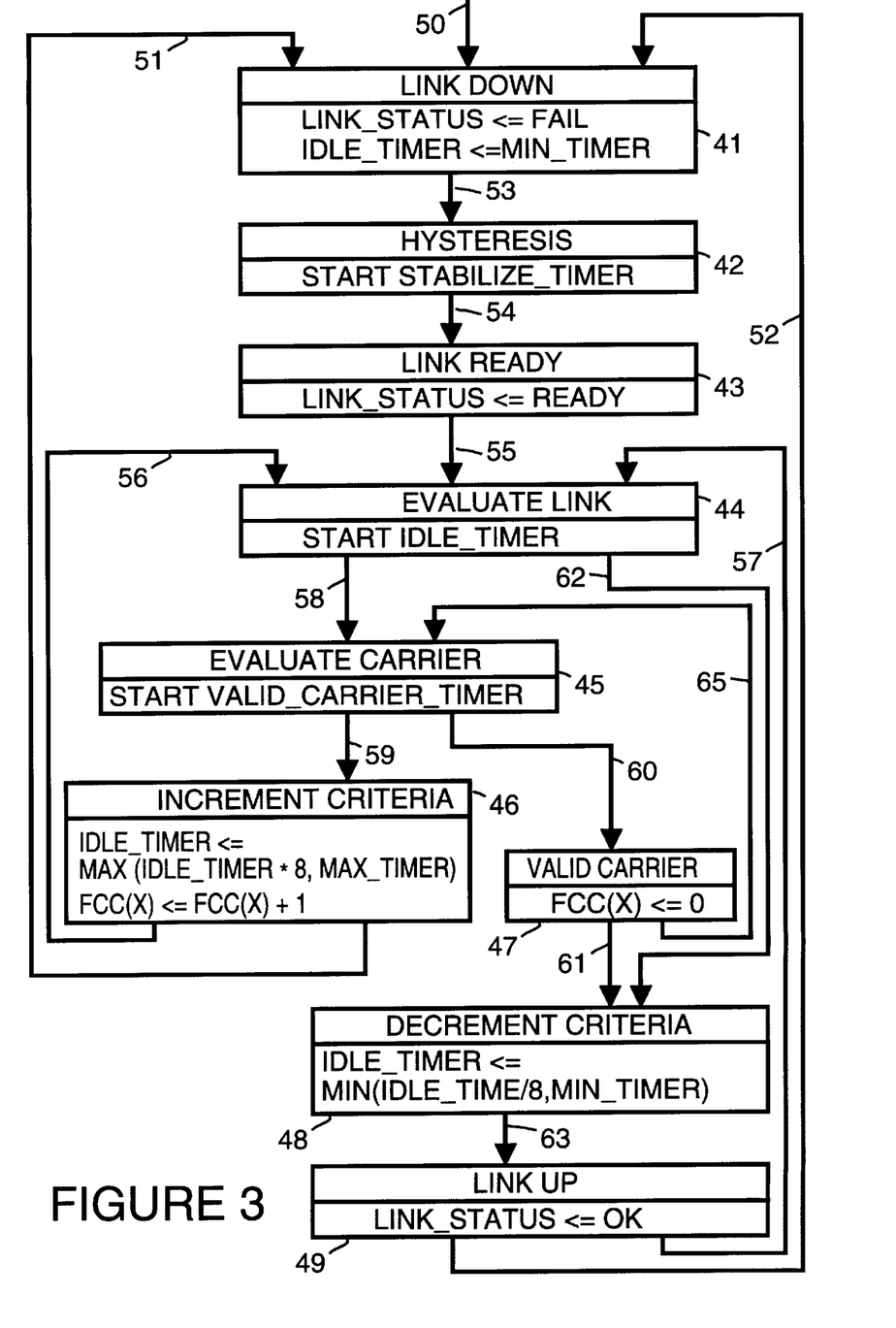
FIG. 3 is a state machine for a link monitor within the PMA shown in FIG. 2, in accordance with a preferred embodiment of the present invention.

FIG. 3 is a state diagram for link monitor state machine 23 in accordance with a preferred embodiment of the present invention.

As indicated by an arrow 50, link monitor state machine 23 enters a link down state 41 upon reset being equal to TRUE, signal_status being equal to OFF, faulting being equal to TRUE, or link_control being equal to DISABLE. In link down state 41, link_status is set equal to FAIL, and idle_timer is set equal to the constant min _timer. For example, the constant min_timer is equal to $2^{21}$ BT±25%, where BT represents bit times. For example, in 100BASE-TX technology BT is equal to 8 nanoseconds. Link down state 41 is the state that link monitor state machine 23 enters upon the link going down.

As indicated by an arrow 53, upon signal_status becoming equal to ON, link monitor state machine 23 transitions from link down state 41 to a hysteresis state 42. In hysteresis state 42, a stabilization timer (stabilize_timer) is started. In the preferred embodiment, stabilize_timer is equal to, for example, 330 microseconds to 1 millisecond. The stabilization timer allows the lower layer circuit (PMD 16) to begin adapting its adaptive equalizer, and PMA 14 to establish its phase lock loop (PLL) and PCS 12 to synchronize its scrambler.

As indicated by an arrow 54, upon stabilize_timer being completed (stabilize_timer_done), link monitor state machine 23 transitions from hysteresis state 42 to a link ready state 43. In link ready state 43, link_status is set equal to ready.

As indicated by an arrow 55, when link_control is equal to ENABLE, link monitor state machine 23 transitions from link ready state 43 to an evaluate link state 44. In evaluate link state 44, an idle_timer is started.

As indicated by an arrow 58, when carrier_status is equal to ON (before idle_timer_done), link monitor state machine 23 transitions from evaluate link state 43 to an evaluate carrier state 45. In evaluate carrier state 45, a valid_carrier_timer is started.

As indicated by an arrow 59, when there is detected a reception error (rxerror_status=ERROR), or carrier_status is equal to OFF and the valid_carrier_timer has not expired (valid_carrier_timer_not done) (i.e., rxerror_status= ERROR+((carrier_status=OFF)*valid_carrier_timer_ not_done)), link monitor state machine 23 transitions from evaluate carrier state 45 to an increment criteria state 46. In increment criteria state 46, the idle_timer is adjusted to be equal to a maximum of the current value of idle_timer multiplied by eight, or the constant max_timer. For example, the constant max_timer is equal to $2^{27}$ BT±25%. Thus the criteria for determining acceptable BER is increased to a maximum level. Additionally FCC(X) is set equal to the current value of FCC(X) plus 1. FCC(X) is the false carrier count. For example, the constant FCCLimit is equal to 2.

As shown by an arrow 56, if FCC(X) is less than the constant FCCLimit, link monitor state machine 23 transitions from increment criteria state 46 back to evaluate link state 44. As shown by an arrow 51, if FCC(X) is equal to the constant FCCLimit, link monitor state machine 23 transitions from increment criteria state 46 back to link down state 41.

As indicated by an arrow 60, when, in evaluate carrier state 45, carrier_status is equal to OFF and the valid_ carrier_timer has expired (valid_carrier_timer_done) (i.e., (carrier_status=OFF)*valid_carrier_timer_done)), link monitor state machine 23 transitions from evaluate carrier state 45 to valid carrier state 47. Entry into valid carrier state 47 indicates that the packet has proceeded normally. In valid carrier state 47, FCC(X) is set equal to 0. Link monitor state machine 23 will stay in valid carrier state 47 until other carrier_status event occurs or the idle_timer expires.

As indicated by an arrow 65, when carrier_status is equal to ON, link monitor state machine 23 transitions from valid carrier state 47 back to evaluate carrier state 45.

As indicated by an arrow 61, when the idle_timer has expired (idle_timer_done), link monitor state machine 23 transitions from valid carrier state 47 to a decrement criteria state 48. In decrement criteria state 48, the idle_timer is adjusted to be equal to a minimum of the current value of idle_timer divided eight, or the constant min_timer. Idle_ timer is reduced to a minimum to help ensure that a reliable link is not burdened with excessive BER requirements. This makes link initialization expedient.

As indicated by an arrow 63, once idle_timer is adjusted, link monitor state machine 23 transitions from decrement criteria state 48 to a link up state 49. In link up state 49, link_status is set to OK.

As indicated by an arrow 57, when link_control is equal to ENABLE, link monitor state machine 23 transitions from link up state 49 back to evaluate link state 44.

As indicated by an arrow 52, when link_control is equal to SCAN_FOR_CARRIER, link monitor state machine 23 transitions from link up state 49 back to link down state 41. When link_control is equal to SCAN_FOR_CARRIER, this indicates that an auto-negotiation block wants to bring down and re-establish the link.

As indicated by an arrow 62, when, in evaluate link state 44, the idle_timer expires (idle timer_done), link monitor state machine 23 transitions from evaluate link state 44 to decrement criteria state 48.

Figure 4:
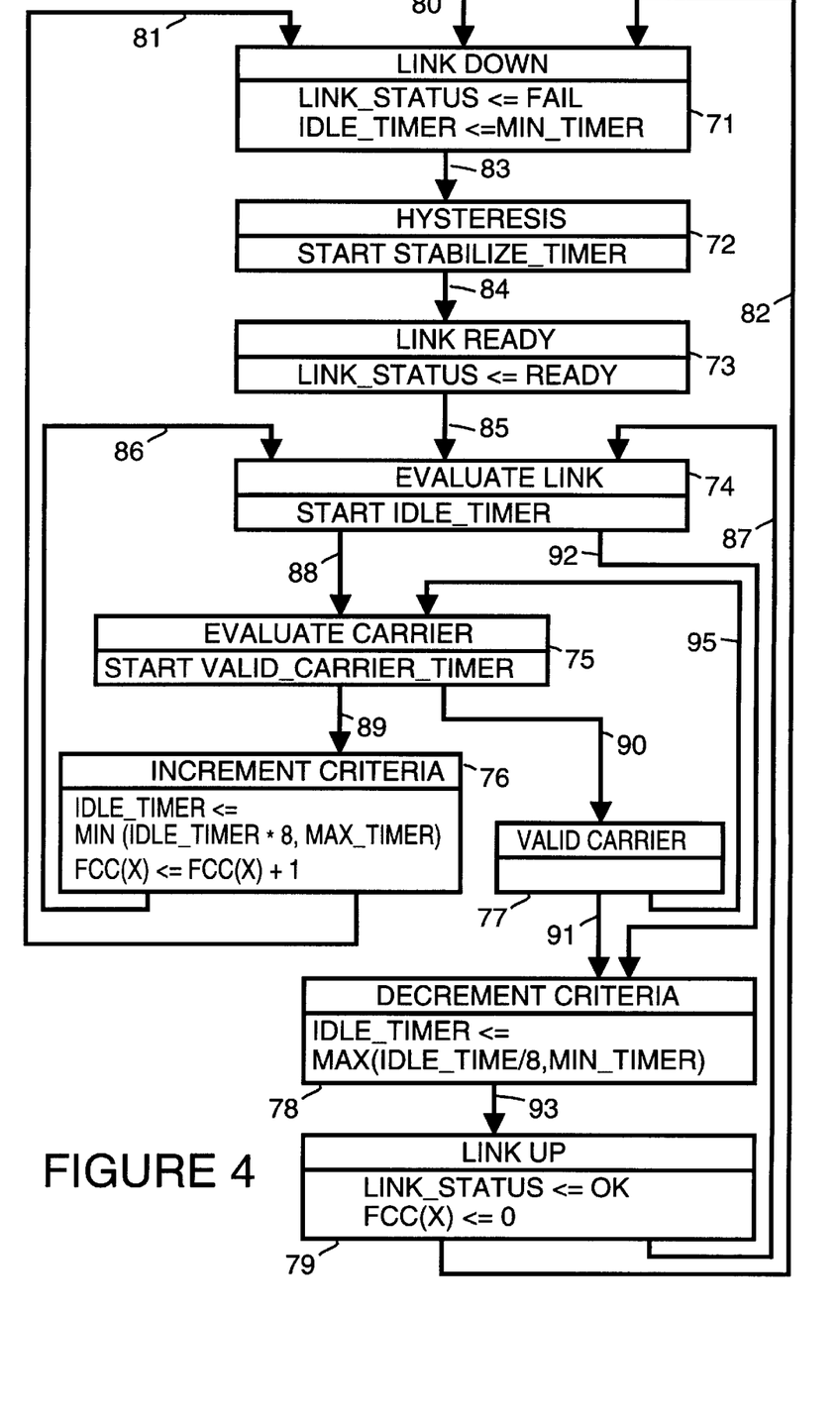
FIG. 4 is a state machine for a link monitor within the PMA shown in FIG. 2, in accordance with an alternative preferred embodiment of the present invention.

In an alternative embodiment of link monitor state machine 23 shown in FIG. 4, FCC(X) is set to zero in a link up state rather than the valid carrier state. The result of this approach changes the behavior of link monitor state machine 23 so that link monitor state machine 23 no long requires "consecutive" false carrier events, but instead link monitor state machine 23 just requires more than FCCLimit (e.g., 2) within the criteria time frame. This is a more stringent requirement than the implementation shown in FIG. 3. This is because the probability of two false carriers in a large time frame (idle_timer is approximately equal to 20 milliseconds to 1 second) is much higher than the requirement for two such errors in a row.

As shown in FIG. 4, as indicated by an arrow 80, link monitor state machine 23 enters a link down state 71 upon reset being equal to TRUE, signal_status being equal to OFF, faulting being equal to TRUE, or link_control being equal to DISABLE. In link down state 71, link_status is set equal to FAIL, and idle_timer is set equal to the constant min_timer. For example, the constant min_timer is equal to $2^{21}$ BT±25%. Link down state 71 is the state that link monitor state machine 23 enters upon reset or a determination that the link is down.

As indicated by an arrow 83, upon signal_status becoming equal to ON, link monitor state machine 23 transitions from link down state 71 to a hysteresis state 72. In hysteresis state 72, a stabilization timer (stabilize_timer) is started. In the preferred embodiment, stabilize_timer is equal to, for example, 330 microseconds to 1 millisecond. The stabilization timer allows the lower layer circuit (PMD 16) to begin adapting its adaptive equalizer, and PMA 14 to establish its phase lock loop (PLL) and PCS 12 to synchronize its scrambler.

As indicated by an arrow 84, upon stabilize_timer being completed (stabilize_timer_done), link monitor state machine 23 transitions from hysteresis state 72 to a link ready state 73. In link ready state 73, link_status is set equal to ready.

As indicated by an arrow 85, when link_control is equal to ENABLE, link monitor state machine 23 transitions from link ready state 73 to an evaluate link state 74. In evaluate link state 74, an idle_timer is started.

As indicated by an arrow 88, when carrier_status is equal to ON (before idle_timer_done), link monitor state machine 23 transitions from evaluate link state 73 to an evaluate carrier state 75. In evaluate carrier state 75, a valid_carrier_timer is started.

As indicated by an arrow 89, when there is detected a reception error (rxerror_status=ERROR), or carrier_status is equal to OFF and the valid_carrier_timer has not expired (valid_carrier_timer_not_done) (i.e., rxerror_status=ERROR+((carrier_status=OFF)*valid_carrier_timer_not_done)), link monitor state machine 23 transitions from evaluate carrier state 75 to an increment criteria state 76. In increment criteria state 76, the idle_timer is adjusted to be equal to a maximum of the current value of idle_timer multiplied by eight, or the constant max_timer. For example, the constant max_timer is equal to $2^{27}$ BT±25%. Thus the criteria for determining acceptable BER is increased to a maximum level. Additionally FCC(X) is set equal to the current value of FCC(X) plus 1. FCC(X) is the false carrier count. For example, the constant FCCLimit is equal to 2.

As shown by an arrow 86, if FCC(X) is less than the constant FCCLimit, link monitor state machine 23 transitions from increment criteria state 76 back to evaluate link state 74.

As shown by an arrow 81, if FCC(X) is equal to the constant FCCLimit, link monitor state machine 23 transitions from increment criteria state 76 back to link down state 71.

As indicated by an arrow 90, when, in evaluate carrier state 75, carrier_status is equal to OFF and the valid_carrier_timer has expired (valid carrier_timer_done) (i.e., (carrier_status=OFF)*valid_carrier_timer_done), link monitor state machine 23 transitions from evaluate carrier state 75 to valid carrier state 77. Entry into valid carrier state 77 indicates that the packet has proceeded normally. Link monitor state machine 23 will stay in valid carrier state 77 until other carrier_status event occurs or the idle_timer expires.

As indicated by an arrow 95, when carrier_status is equal to ON, link monitor state machine 23 transitions from valid carrier state 77 back to evaluate carrier state 75.

As indicated by an arrow 91, when the idle_timer has expired (idle_timer_done), link monitor state machine 23 transitions from valid carrier state 77 to a decrement criteria state 78. In decrement criteria state 78, the idle_timer is adjusted to be equal to a minimum of the current value of idle_timer divided by eight, or the constant min_timer. Idle_timer is reduced to a minimum to help ensure that a reliable link is not burdened with excessive BER requirements and speed up link initialization.

As indicated by an arrow 93, once idle_timer is adjusted, link monitor state machine 23 transitions from decrement criteria state 78 to a link up state 79. In link up state 79, link_status is set to OK. Additionally, in link up state 79, FCC(X) is set equal to 0.

As indicated by an arrow 87, when link_control is equal to ENABLE, link monitor state machine 23 transitions from link up state 79 back to evaluate link state 74.

As indicated by an arrow 82, when link_control is equal to SCAN_FOR_CARRIER, link monitor state machine 23 transitions from link up state 79 back to link down state 71. When link_control is equal to SCAN_FOR_CARRIER, this indicates that auto-negotiation wants to bring the link down and re-establish the link.

As indicated by an arrow 92, when, in evaluate link state 74, the idle_timer expires (idle_timer_done), link monitor state machine 23 transitions from evaluate link state 74 to decrement criteria state 78.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for monitoring a link connection within a sublayer of a node connected to a network, the method comprising the following steps:
   (a) entering an evaluate link state and starting an idle timer;
   (b) in the evaluate link state, if a carrier event is detected before expiration of the idle timer, entering an evaluate carrier state;
   (c) in the evaluate carrier state, starting a valid carrier timer;
   (d) in the evaluate carrier state, if a status error is detected or if the carrier event completes before expiration of the valid carrier timer, entering an increment criteria state;
   (e) in the increment criteria state, incrementing a false carrier count; and,
   (f) in the increment criteria state, if the false carrier count, after being incremented, is equal to a false carrier count limit, entering a link down state.

2. A method as in claim 1 additionally comprising the following steps:
   (g) in the evaluate link state, upon expiration of the idle timer, entering a decrement criteria state;
   (h) in the decrement criteria state, if the idle timer is not already at a minimum value, reducing a current value of the idle timer; and,
   (i) in the increment criteria state, if the idle timer is not already at a maximum value, increasing the current value of the idle timer.

3. A method as in claim 2 additionally comprising the following steps:
   (j) in the link down state, setting the idle timer to the minimum value and setting a link status to fail;
   (k) in the link down state, upon receiving a signal status on, entering a hysteresis state;

(l) in the hysteresis state, starting a stabilizer timer;

(m) in the hysteresis state, upon receiving a signal status on, entering a link ready state;

(n) in the link ready state setting the link status to ready; and, (o) in the link ready state, upon a link control being enabled, entering the evaluate link state.

4. A method as in claim 2 additionally comprising the following steps:

(j) in the evaluate carrier state, if when the valid carrier timer expires when the carrier status is off, entering a valid carrier state.

5. A method as in claim 4 additionally comprising the following steps:

(k) in the valid carrier state, setting the false carrier count to zero; and, (l) in the valid carrier state, if the idle timer expires, entering the decrement criteria state.

6. A method as in claim 5 additionally comprising the following steps:

(m) from the decrement criteria state, entering a link up state;

(n) in the link up state, setting a link status to OK;

(o) in the link up state, upon a link control being equal to enable, entering the evaluate link state; and, (p) in the link up state, upon the link control being equal to SCAN_FOR_CARRIER, entering the link down state.

7. A method as in claim 5 additionally comprising the following steps:

(m) in the valid carrier state, if the carrier status is on, entering the evaluate carrier state.

8. A method as in claim 4 additionally comprising the following steps:

(k) in the valid carrier state, if the idle timer expires, entering the decrement criteria state; and, (l) in the valid carrier state, if the carrier status is on, entering the evaluate carrier state.

9. A method as in claim 8 additionally comprising the following steps:

(m) from the decrement criteria state, entering a link up state;

(n) in the link up state, setting a link status to OK;

(o) in the link up state, setting the false carrier count to zero;

(p) in the link up state, upon a link control being equal to enable, entering the evaluate link state; and, (q) in the link up state, upon the link control being equal to SCAN_FOR_CARRIER, entering the link down state.

10. A network node which is connectable to a network, the node comprising:

a physical media access sublayer, the physical media access sublayer comprising a link monitor state machine, the link monitor state machine including:

an evaluate link state in which an idle timer is started;

an evaluate carrier state which is entered from the evaluate link state when a carrier event is detected before expiration of the idle timer, wherein in the evaluate carrier state, a valid carrier timer is started;

an increment criteria state which is entered from the evaluate carrier state if a status error is detected or if the carrier event completes before expiration of the valid carrier timer, wherein in the increment criteria state, a false carrier count is incremented; and, a link down state entered from the increment criteria state, if the false carrier count, after being incremented, is equal to a false carrier count limit.

11. A network node as in claim 10 wherein in the increment criteria state, if the idle timer is not already at a maximum value, the current value of the idle timer is increased and wherein the link monitor state machine additionally includes:

decrement criteria state which is entered from the evaluate link state upon expiration of the idle timer, wherein in the decrement criteria state, if the idle timer is not already at a minimum value, a current value of the idle timer is reduced.

12. A network node as in claim 11 wherein in the link down state, the idle timer is set to the minimum value and a link status is set to fail, and wherein the link monitor state machine additionally includes:

a hysteresis state entered from the link down state, upon reception of a signal status on, wherein in the hysteresis state, a stabilizer timer is started; and, a link ready state entered from the hysteresis state, upon reception of a signal status on, wherein in the link ready state the link status is set to ready, and wherein upon a link control being enabled, the evaluate link state is entered.

13. A network node as in claim 11, wherein the link monitor state machine additionally includes:

a valid carrier state entered from the evaluate carrier state, when the valid carrier timer expires and the carrier status is off.

14. A network node as in claim 13 wherein:

in the valid carrier state, the false carrier count is set to zero; and, in the valid carrier state, if the idle timer expires, the decrement criteria state is entered.

15. A network node as in claim 14, wherein the link monitor state machine additionally includes:

a link up state entered from the decrement criteria state, wherein in the link up state, a link status to is set to OK, wherein in the link up state, upon a link control being equal to enable, the evaluate link state is entered, and wherein in the link up state, upon the link control being equal to SCAN_FOR_CARRIER, the link down state is entered.

16. A network node as in claim 14 wherein in the valid carrier state, if the carrier status is on, the evaluate carrier state is entered.

17. A network node as in claim 13 wherein in the valid carrier state, if the idle timer expires, the decrement criteria state is entered and wherein in the valid carrier state, if the carrier status is on, entering the evaluate carrier state.

18. A network node as in claim 17, wherein the link monitor state machine additionally includes:

a link up state entered from the decrement criteria state, wherein in the link up state, a link status to is set to OK, wherein in the link up state, the false carrier count is set to zero, wherein in the link up state, upon a link control being equal to enable, the evaluate link state is entered, and wherein in the link up state, upon the link control being equal to SCAN_FOR_CARRIER, the link down state is entered.

19. A method for monitoring a link connection within a sublayer of a node connected to a network, the method comprising the following steps:

(a) upon detecting a carrier signal starting a valid carrier timer;

(b) upon the carrier signal ceasing to be detected before expiration of the carrier timer, incrementing a false carrier counter; and, (c) upon the false carrier counter reaching a false carrier counter limit, marking the link connection as being down.

20. A method as in claim 19 wherein step (b) additionally includes the following substep:
  (b.1) upon the carrier signal ceasing to be detected after expiration of the carrier timer, re-initiating the false carrier counter.

21. A network node which is connectable to a network, the node comprising:
  a physical media access sublayer, the physical media access sublayer comprising,
  a false carrier counter, and
  a link monitor, the link monitor marking a link connection as being down when the false carrier counter reaches a predetermined limit, the false carrier counter changing count every time a carrier signal that is initially detected ceases to be detected before expiration of a time period of predetermined length, the time period beginning upon initial detection the carrier signal.

* * * * *